United States Patent [19]
Palmer

[11] Patent Number: 5,209,012
[45] Date of Patent: May 11, 1993

[54] METHOD FOR IMPROVED PLANT GROWTH

[76] Inventor: Sharon-Joy Palmer, 1725 Brenda Rd., Rio Rancho, N. Mex. 87124

[21] Appl. No.: 731,652

[22] Filed: Jul. 17, 1991

Related U.S. Application Data

[62] Division of Ser. No. 401,666, Aug. 31, 1989, Pat. No. 5,035,077.

[51] Int. Cl.$^5$ ............................................. F24F 13/10
[52] U.S. Cl. ........................................................ 47/17
[58] Field of Search ...................... 47/17; 52/79.1, 20, 52/36, 107

[56] References Cited

U.S. PATENT DOCUMENTS 5,035,077  7/1991  Palmer .................................... 47/17

Primary Examiner—David A. Scherbel
Assistant Examiner—Joanne C. Downs
Attorney, Agent, or Firm—Arthur T. Fattibene; Paul A. Fattibene

[57] ABSTRACT

A method of attaining horticulture growth in a modular self contained growth chamber formed of insulated panels having a grated sub-floor. The method includes growing algae in an algae tank below the sub-floor; and providing stacked trays having mesh bottoms to hold a nutrient enriched gel. Providing a broad spectrum of light on the south wall; irrigating mist in a timed sequence with the provision of light and maintaining the chamber at a constant 68 to 78 degree Fahrenheit temperature with high humidity. Power is provided by a photovoltaic panel permitting installation in remote locations. The growth chamber and system provides high yields with little space and in locations not normally conducive to efficient growing.

12 Claims, 7 Drawing Sheets

METHOD FOR IMPROVED PLANT GROWTH

RELATED APPLICATIONS

This is a divisional application of my co-pending application Ser. No. 07/401,666 filed Aug. 31, 1989, now U.S. Pat. No. 5,035,077 granted Jul. 30, 1991.

FIELD OF THE INVENTION

This invention relates generally to a horticulture growth chamber, and more particularly to a modular self contained efficient biosphere growing chamber and system.

BACKGROUND OF THE INVENTION

The concept of growing plants of various kinds in a horticulture chamber is well known. There are numerous examples of such chambers; as for example U.S. Pat. No. 3,458,951 to Martin on Aug. 5, 1969 entitled "Hydroculture Grass Unit."

The known horticulture chambers are devices that aid in the growing of various plants. Each such unit contributes in some beneficial way to the production of plants, but none provide a modular self-contained unit requiring little maintenance while producing improved yields.

SUMMARY OF THE INVENTION

The present invention comprises a modular structure that is easily assembled and expanded. Rigid insulated panels are assembled to form a chamber. The chamber has a grated sub-floor, below which algae is grown. In a growing area are located adjustable seed racks capable of holding specially designed plastic trays. Within the trays is a biodegradable mesh covered by specially formulated nutrient gel. On the wall opposite the growing area, preferably on the south wall, are positioned special broad band fluorescent bulbs. An irrigation system is spaced around the chamber to provide a mist of water vapor for the plants in the growing area. The growing chamber is constructed to maintain a constant temperature between 68 and 78 degrees Fahrenheit with high humidity. A photovoltaic electrical system is used to supply power to the chamber. The entire chamber or unit is comprised of substantially all noncorrosive materials including fiberglass and plastic. The method of growing plants in the chamber embodying the present invention includes the steps of placing plant seed within a nutrient gel placed in traps arranged in the enclosed chamber; and subjecting the seed to water for at least 72 hours in the presence of a broad spectrum light sources; which includes cycling the irrigation of the seeds with the charged water four times a day for at least 10 minutes each time; and illuminating the seeds and water with the broad spectrum light source for at least eight hours per day including during the cycling step.

Accordingly, it is an object of the invention to provide a growth chamber having high yield in a small area.

It is another object of the invention to provide a chamber that is easy to assemble and build for multiple purposes.

It is yet another object of the invention to provide a chamber capable of growing food in remote locations.

It is still another object of the invention to provide a chamber that requires no external power.

It is still a further object of the invention to provide efficient plant growth method utilizing the least water possible.

It is yet a further object of the invention to provide a method for effecting a biologically pure controlled environment for plant growth.

It is yet a further object of the invention to provide an energy efficient method for growing plants.

It is yet a further object of the invention to provide a method of growing seeds in a substantially metal free environment.

These and other objects will become more readily apparent in view of the following more detailed description.

DETAILED DESCRIPTION OF THE PREFERRED EMBODIMENTS

Figure 1:
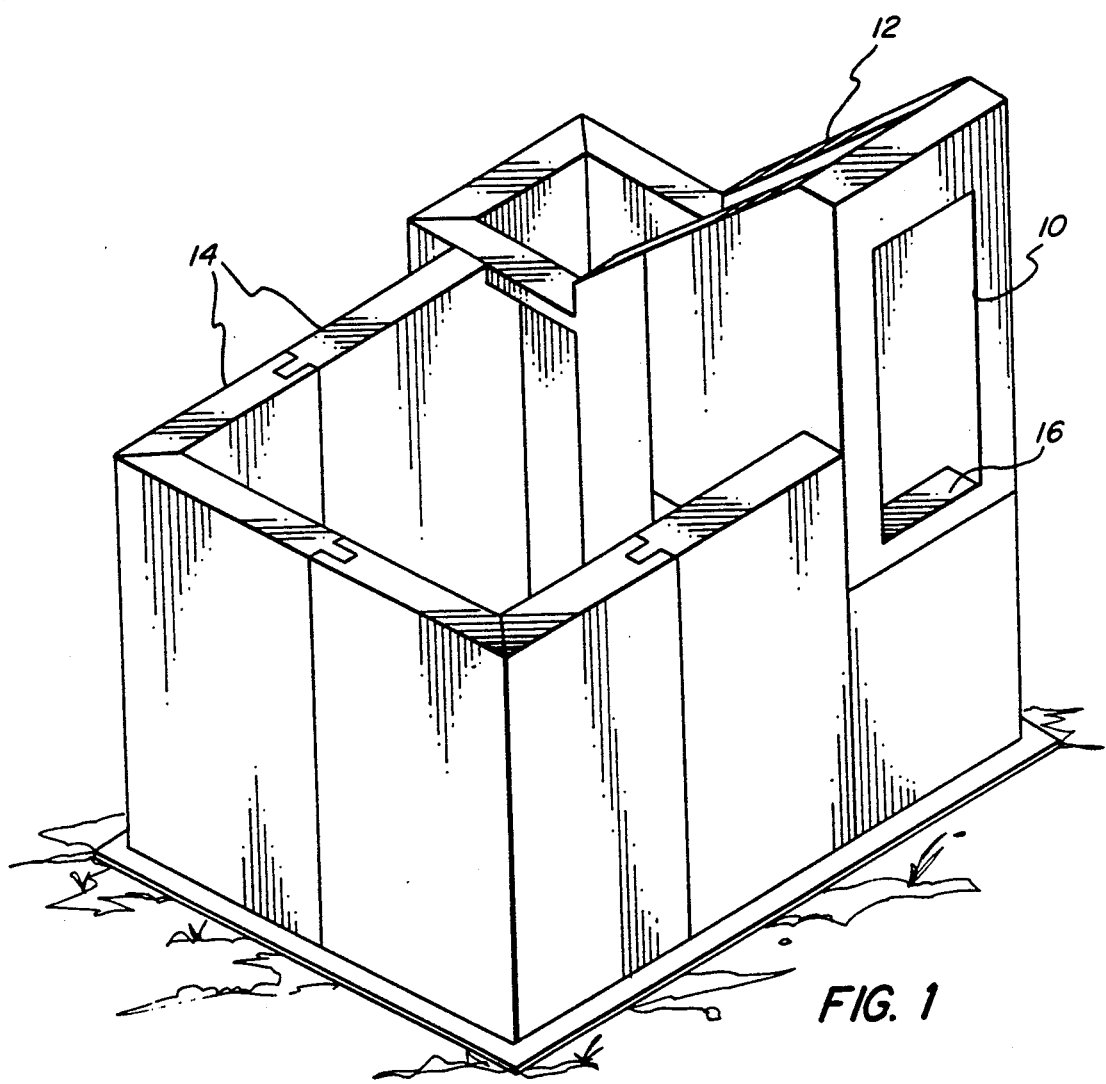
FIG. 1 is a perspective view of one embodiment of the invention.

FIG. 1 illustrates the modular or sectioned construction of the present invention. Panels 14 are made of a moisture resistant plastic. Panels 14 also have interlocking edges that are air and water tight. Additionally, the panels 14 incorporate three or six inch foam insulation. This helps to maintain a constant temperature inside despite fluctuations in outside temperature. This modular construction also permits the chamber or unit to be easily expanded. Either side of the modular unit can be expanded with the attachment of additional panels 14. These integrated foam core panels are unique in that they provide no batting or facing. They are fiberglass over foam panels that provide an air tight and water tight seal due to the tongue and groove construction. They are resistant to moist environments and are non corrosive. They are self sustaining and self supporting structural elements that are eighty percent lighter than steel. They can be expanded in all directions. The basic unit structure can be used not only for a growth chamber as in the preferred embodiment, but commercial, industrial, electronic, and housing purposes. In some applications the unit may need to be strapped down due to wind loads on such a light structure.

Figure 2:
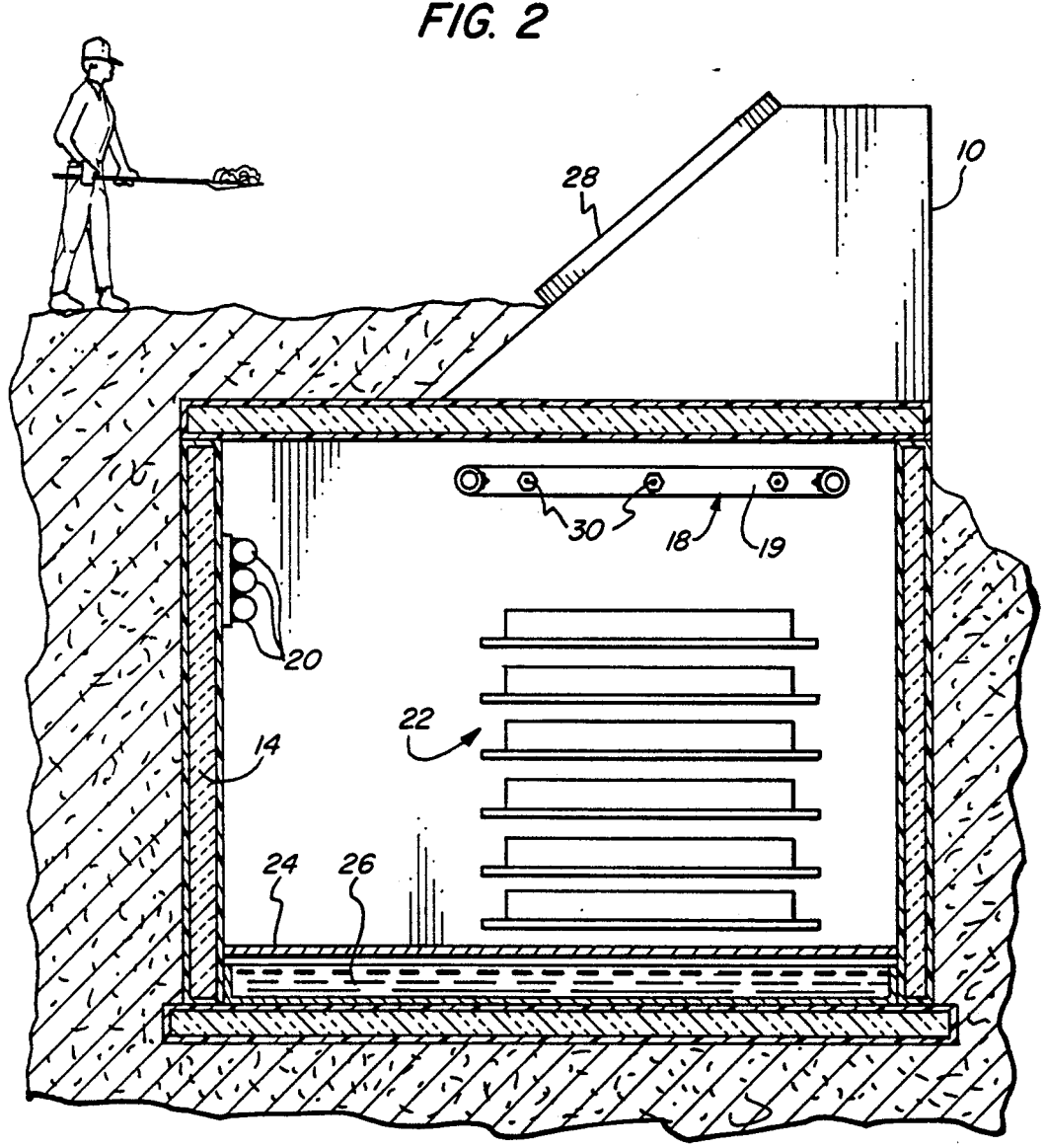
FIG. 2 is a cross section of one embodiment of the invention as installed underground.

The elevated doorway 10 permits the entire unit to be buried. Of course, the unit need not be buried, but to obtain maximum temperature stability within the unit it is preferred to bury the unit. The top of the roof 12 is slanted permitting a photovoltaic panel 28 to be mounted thereon as illustrated in FIG. 2. Stairs 16 lead from the elevated doorway 10 down into the growing area. The mechanical and electrical hardware can then be placed under the stairs conserving valuable growing or storage area.

Figure 3:
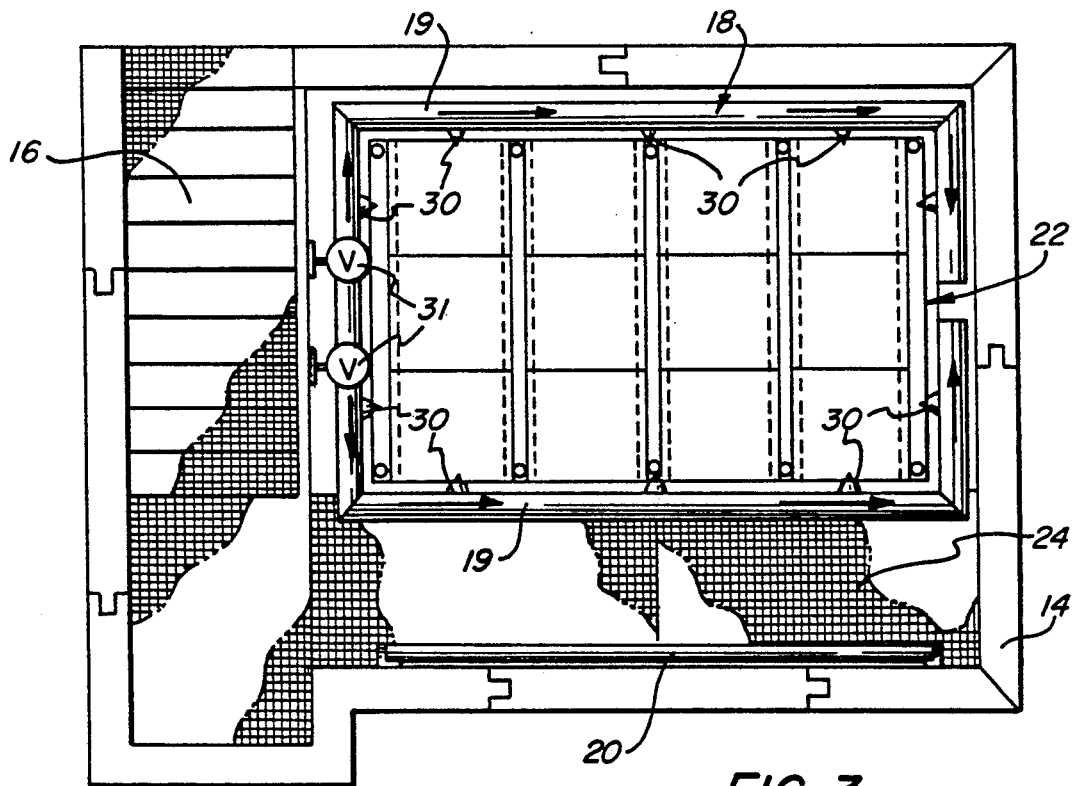
FIG. 3 is a floor plan of one embodiment of the invention.

FIGS. 2 and 3 illustrates the interior portion of the growth chamber. At the bottom of the chamber is a grating cover 24 covering an algae tank 26. The algae tank 26 contributes to the high efficiency of the growth chamber by making every possible area of the growth chamber productive. A bubbler is placed inside the algae tank for re-circulating and aerating the water. A growing area is formed by stacked trays 22. The trays 22 are made from molded plastic having raised centers so that excess water drips from the edges thereof so as not to drip onto the plants in the lower trays. The bottom of the trays 22 are also made of a fine mesh having a growth gel medium therein. Seeds are then placed in the gel medium which promotes growth.

Broad spectrum lights 20 are placed on the south wall of the chamber. The lights 20 provide a broad spectrum of light simulating natural light. This results in better and healthier plant growth. One such light source is the KIVA light manufactured by K.I.V.A., Inc., 912 Broadway NE, Albuquerque, N. Mex. 07102. The KAVA light has been found to be exceptionally beneficial to plant growth. The KAVA light also aids in purifying the water in the re-circulation irrigation system. The lights 20 are placed on the south wall to provide maximum light travel as well as to isolate the lights 20 from the misting irrigation nozzles. This placement has the additional benefit of reflecting light off the water droplets and onto the plants during misting. Additionally, with the lights positioned on the south wall this allows plant growth and root direction to follow the earth's magnetic field. Of course in the southern hemisphere this would be reversed.

Irrigation is provided by irrigation tubing or pipes 19 placed over and around the stack of trays 22 in several levels. The irrigation pipes 19 have nozzles 30 spaced along their length. The nozzles 30 are positioned to provide a fine mist of nutrient enriched water over the trays 22. The configuration of the irrigation system provides an even mist over all the trays 22 containing the plant growth. The excess irrigation water is recirculated by a pump. The pump can be positioned under the stairway to save valuable growing area. A three way valve is used to divert water either to the re-circulating tank, a waste tank, or to add fresh water from a reserve tank if needed. The valve can be either manually or automatically controlled by appropriate electronic controls. Before being re-circulated the irrigation water is filtered. This eliminates and traps any foreign material from clogging the nozzles 30 as well as helping to keep the irrigation water clean.

Additionally, before being re-circulated the irrigation water can be bubbled and sprayed into the air while being exposed to light. This aerates and purifies the water preventing the water from becoming stagnant.

The irrigation system can also be controlled to provide different quantities of spray to be supplied to the different horizontal levels of spray nozzles 30. This permits the control of the quantity of water being supplied at each level. Typically, a larger quantity of water is emitted from the higher nozzles 30 than from the lower ones. This provides more efficient irrigation cycle times and more evenly distributed irrigation and moisture due to the movement downward of the excess moisture from the higher irrigation levels. The irrigation system 18 has a configuration so that either end of the chamber or unit can be expanded. As seen in FIG. 3, the tubes or pipes 19 extend around the perimeter of the chamber or unit. The direction of water flow within the pipes or tubes 19 is indicated by the arrows. The water flow is split so as to flow in two directions around the perimeter of the growing area within the chamber or unit. Water flows in each direction only around half of the perimeter of the growth area. Water flow is terminated at the end of each of the two directions. Valves 31 control the flow of the water in either direction. In this way, when the unit is to be expanded, panels 14 can be added to the end of the unit and the additional plumbing for the irrigation more easily installed than if the irrigation system 18 consisted of a single loop around the entire perimeter of the growth area.

The slanted stairway roof illustrated in FIG. 2 supports a photovoltaic solar panel. The electricity generated is stored in a bank of batteries located under the stairs. The batteries are capable of storing sufficient energy to power the growth chamber for at least 72 hours. The photovoltaic solar electrical system is capable of providing all the power to run the lighting, irrigation, and other optional electrical equipment, such as a music system. Therefore, external electrical power need not be provided which is advantageous, and necessary in remote locations.

A timer connected to the electrical equipment provides automated control of the growing chamber. This permits a cycle to be used optimizing growth. The lights, as well as the irrigation system can be cycled on and off promoting the most rapid plant growth for a particular variety of plant. The timer and all electrical controls relating thereto can be placed within the growth chamber in a sealed container. This protects the controls from the high humidity maintained in the growth chamber.

The trays 22 are stacked in an array as illustrated in FIGS. 2 and 3. The trays 22 are stacked on a rack system. Within each tray is placed a specially formulated nutrient gel. The nutrient gel is placed on a biodegradable mat. The active ingredients are time released to work on contact with water. The nutrient can be used with vermiculite to extend the period of time it will remain active. The biodegradable mat will dissolve before the nutrient is completely absorbed by the plants. The specially formulated nutrient is composed of a natural ingredient from soil found only in New Mexico. It is a specially formulated nutrient with a rich earth laden mineral base. It contains 20% phosphorous, 30% potash, 20% nitrogen, 10% calcium material, and the balance inactive ingredients. It will support a one and one-half to three inch root growth on grass plants or hair root plants. The nutrient has an organic base that keeps phosphates available and keeps alkaline water from interfering with long term phosphate uptake. Additionally, it stimulates bacterial activity and provides direct assimilation of calcium for plant growth.

Figure 4:
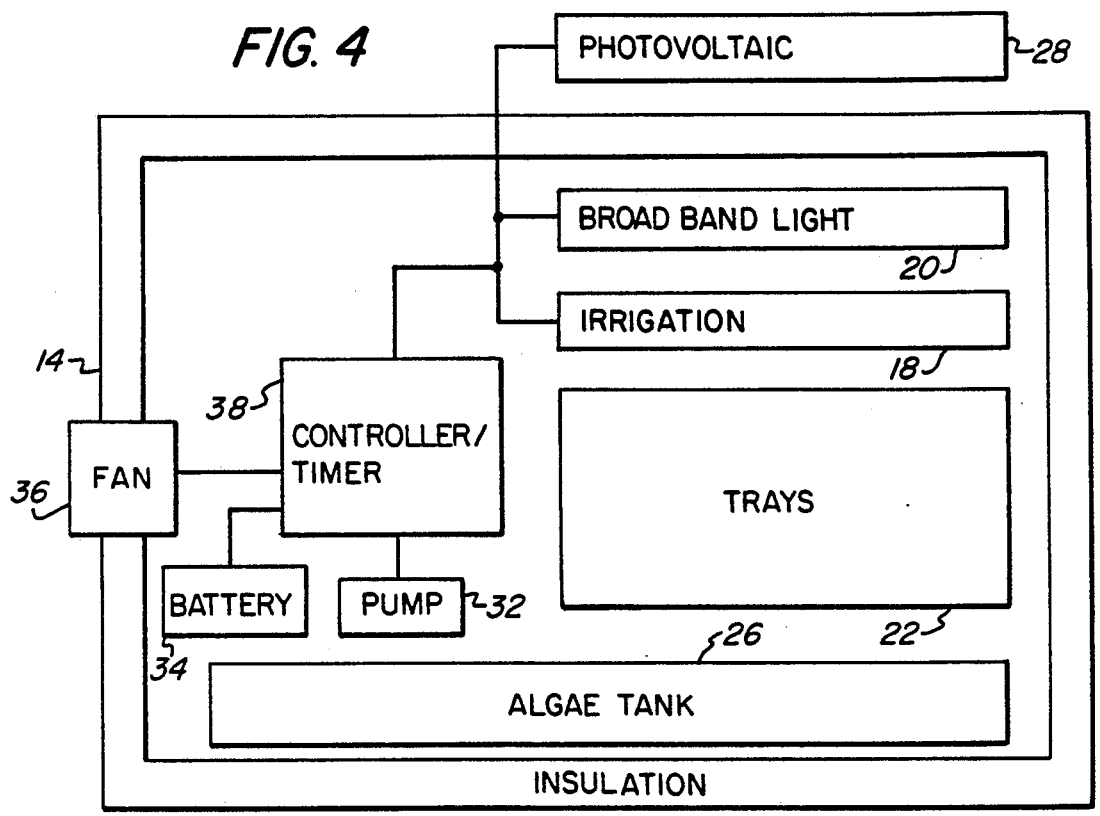
FIG. 4 is a block diagram illustrating the invention.

In FIG. 4, a block diagram, the relationship and combination of the invention can be better appreciated. Each labeled box represents an element of the invention. In referring to each box the name and reference number of the element is used so that the same number will represent the same element in each figure of the drawings. Therefore, the box representing the photovoltaic panel is labeled 28 and will be referred to as photovoltaic panel 28.

Photovoltaic panel 28 supplies power to the controller and timer 38. The controller and timer 38 in turn distributes the power to light 20, irrigation system 18, pump 32, optional fan 36, and battery 34. The controller and timer 38 both controls the distribution of power to the other elements as well as the timing of their on and off cycles. The controller and timer 38 also regulates the power to and from the storage batter 34. During periods of surplus power generation from photovoltaic panel 28 the controller and timer 38 will divert power to charge storage battery 34. Conversely, during times of insufficient power generation from photovoltaic panel 28, the controller and timer 38 will use the energy stored in the batter 34 to supply power to the elements requiring power. Each electrical element of the growth chamber is selected to provide very efficient operation to conserve power. In this way, the entire growth chamber can be totally self contained. This permits operation in remote areas where no electrical power is available, or where it is too expensive to be of practical use.

The controller and timer 38 also controls the on and off cycling of the electrical equipment. For example, the controller and timer 38 will periodically energize pump 32 to bubble the algae tank 26. Also, when necessary fan 36 will be energized to exhaust any excess heat or humidity that may accumulate within the growth chamber. The fan 36 is positioned at a convenient location through one of the modular insulated panels 14. The controller and timer 38 also controls the cycling of the light 20 and irrigation system 18. This is perhaps its most important function, for this directly controls the efficient growth of the plants placed on trays 22.

One method of growing that has proven to obtain superior results is to expose the fresh water to the broad spectrum KAVA light for 72 hours to biologically purify the water prior to being used. The trays are then filled with the nutrient growth gel and seeded. The lighting is then cycled on and off for predetermined periods. The seeds are irrigated four to six times a day for approximately seven to fourteen minutes each time. The lights can be cycled on at the same time as the irrigation so that the light can beneficially react with the water to purify it. This greatly helps to eliminate harmful mildew and other disadvantageous organisms. Also, subliminal music can be played for up to eighteen hours per day to encourage plant growth. The trays are rotated to provide a range of growth stages so that all plants do not mature at the same time. This provides consistent harvests spaced throughout the growing period.

The timer can also be set for the following stages:

STAGE I

Lights-tape player. Timing set adjustments, 24 hours, 1 hour intervals.

STAGE II

Internal irrigation pump with pump starter. Timing set adjustment, 6 hours, 1 minute intervals.

STAGE III

Exterior pump with pump starter. Timing set 24 hours with flat cut-off switch and override switch from Stage II and control setting capable of setting for sunlight hours when connected to photovoltaic system.

STAGE IV

Thermostat adjustable temperature for exhaust fan and air conditional control-heater.

STAGE V

Circulator pump. 1 hour cycle adjustable on 10 minute interval with off switch when Stage II is operating.

Figure 5:
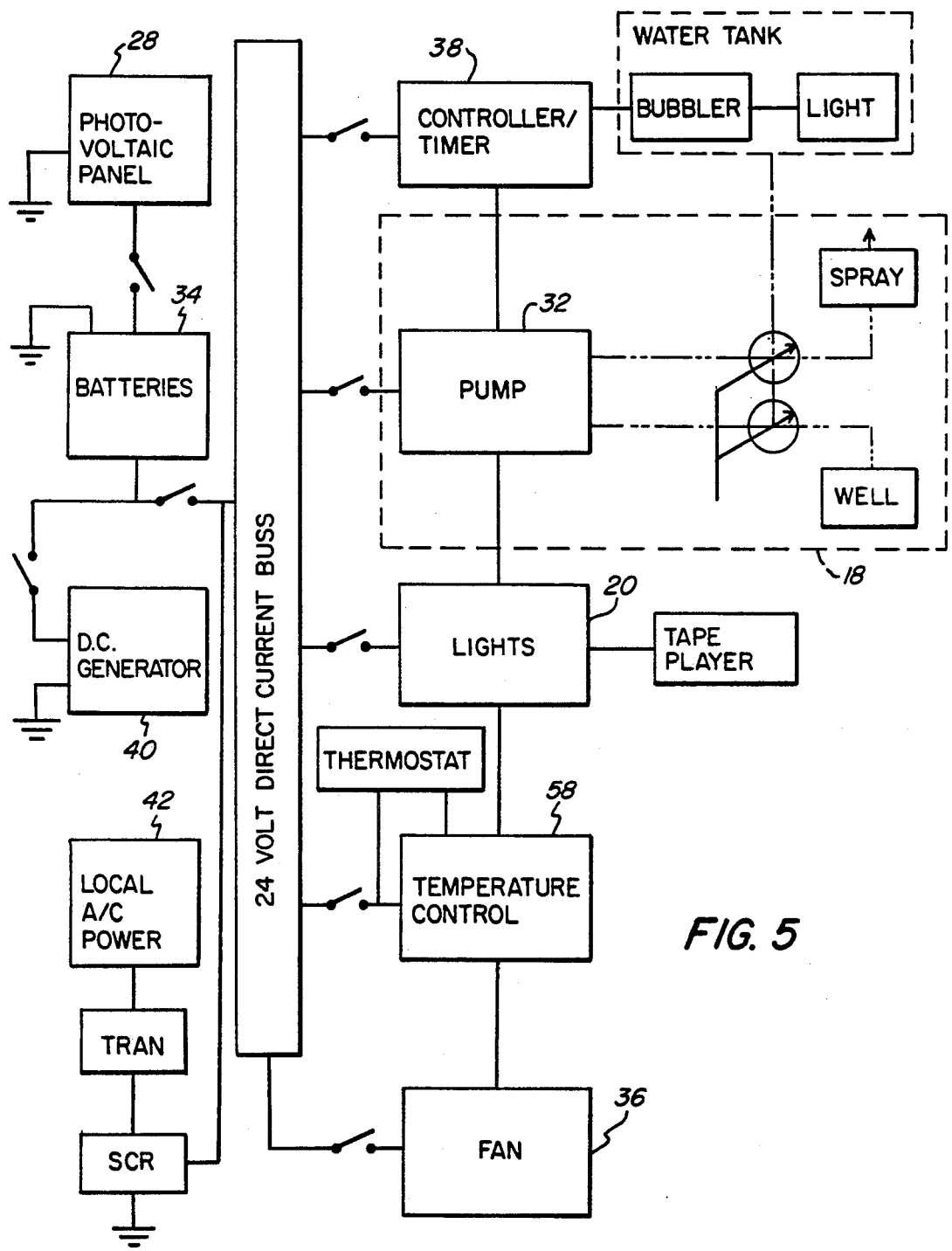
FIG. 5 is a block diagram illustrating the electrical connections used for the invention.

FIG. 5 illustrates the alternative power sources and their electrical connections that can be used. The blocks 28, 34, 40 and 42 represent the various selectable alternative power sources available. A photovoltaic panel array 28 can be selected to power the unit when normal sunlight is available. A D.C. storage battery system 34 can be used when sufficient sunlight is not available to power the unit. The battery system 34 is comprised of ten lead-acid twelve volt batteries connected in a two by five array to store sufficient twenty-four volt power to last approximately three days. A D.C. generator 40 can be used to supplement or provide additional power as well as to charge the battery system 34 when normal sunlight is not available for extended periods of time. Local A.C. power 42 can also be stepped down to approximately twenty-four volts and rectified to provide power to the unit or to charge the battery system 34. These alternative power sources are selectively connected to a D.C. bus 56 which in turn powers the various electrical elements of the unit. For example, controller/timer 38, pump 32, lights 20, temperature control 58, and fan 36.

Figure 6:
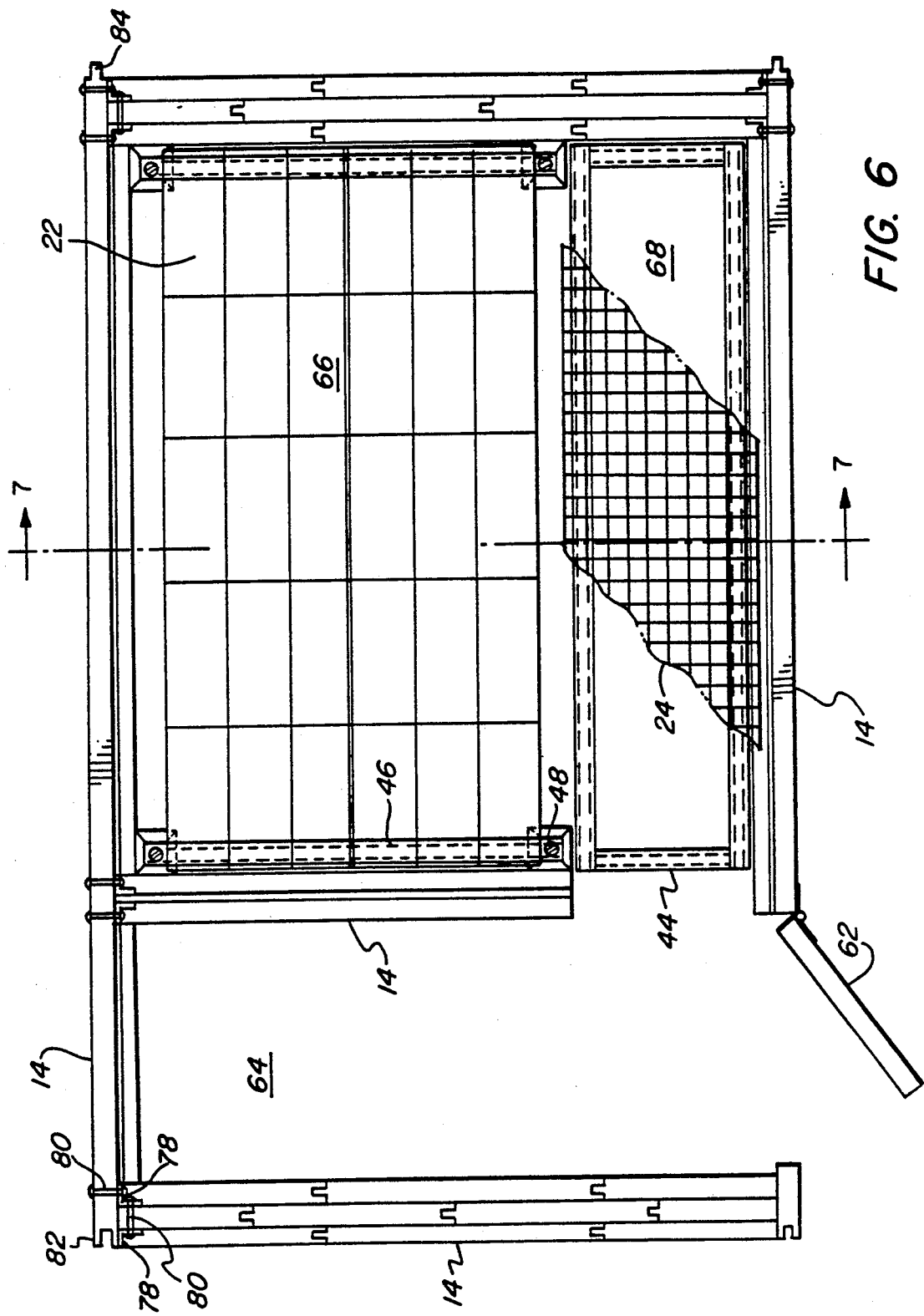
FIG. 6 is a plan view of another embodiment of the invention.
Figure 7:
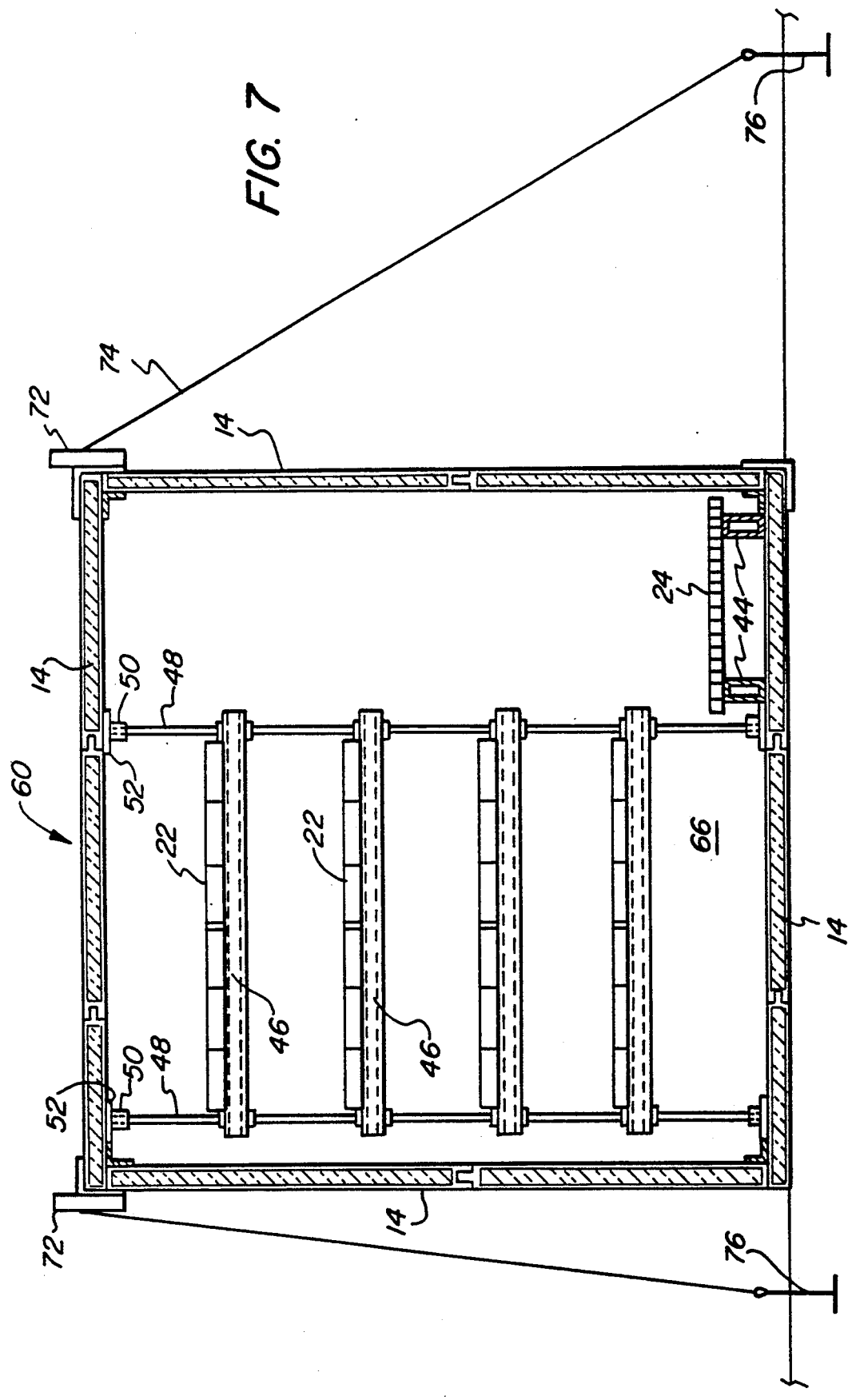
FIG. 7 is a cross sectional view of FIG. 6 taken along line 7—7.
Figure 8:
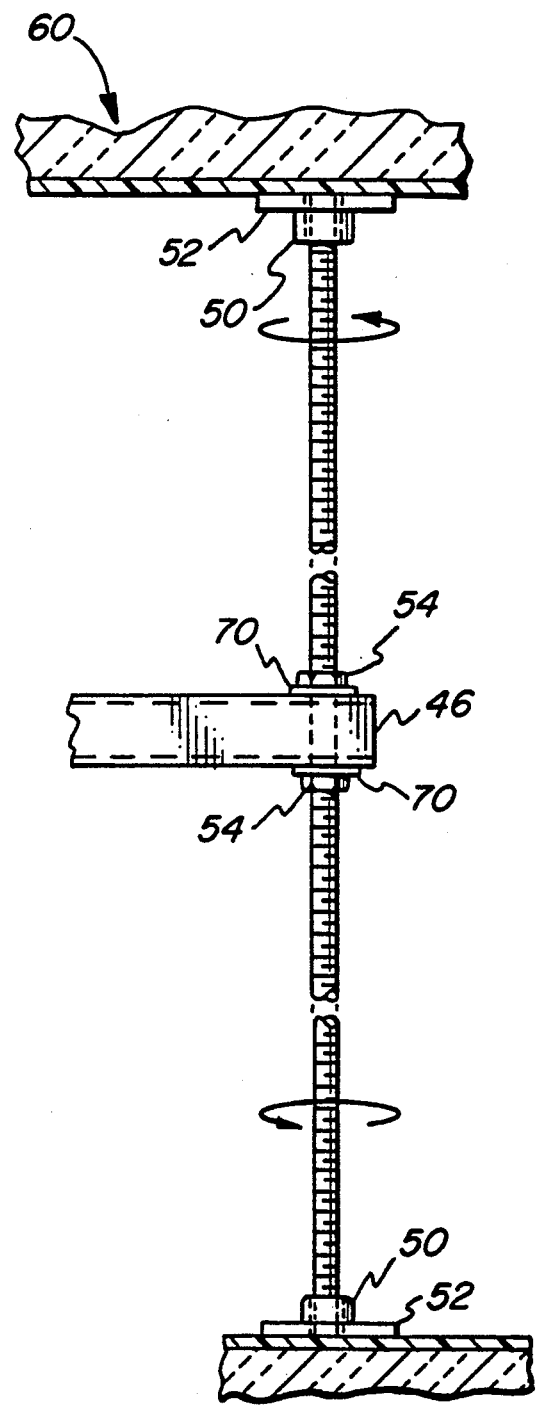
FIG. 8 is a more detailed illustration of the rack support system.

Another embodiment is illustrated in FIGS. 6-8. This embodiment is of a simpler rectangular construction. As illustrated in FIG. 6, the modular or sectioned panels 14 are positioned in a rectangle. As can be seen in FIG. 6, the panels 14 can be doubled or even tripled to provide additional rigidity or insulation. Brackets 78 are L-shaped and are used to secure the panels 14 together. Through bolts 80 are used to secure the brackets 78 to the panels 14. When attaching a male end 84 of a panel 14, the female end 82 on the end of a panel 14 can be cut off and used as a spacer between the female end of a panel 14 and the pair of brackets 78 used to attach the panels at right angles. The through bolts 80 can then be securely fastened without deformation which would result if the brackets 78 were tightened down on the uneven surface of the male end 84 of a panel 14.

The roof panel comprising the flat roof 60 can have incorporated therein a structural member for lifting the unit into position or for strapping the unit down once assembled to maintain stability in high winds. The unit is entered by door 62. The unit is sectioned into three different areas, storage area 64, growth area 66, and work area 68. The storage area 64 can also house the various electrical and mechanical systems needed to provide an optimum growth environment. The growth area 66 is the largest area and is comprised of shelving or trays 22 on which seeds and plants are placed. The work area 68 is comprised of an elevated grating 24 placed over structural fiberglass grating supports 44. The grating supports are manufactured by a pultrusion process. In this process fiberglass reinforcements are pulled through a bath of thermosetting resin and then placed into a heated forming and curing die to produce composite structural shapes. This results in an extremely strong corrosion resistant lightweight structural member ideal for the warm humid environment of the growth chamber unit. The shelf or tray supports 46 are also made of structural fiberglass.

The construction of this embodiment is more clearly illustrated in FIG. 7. The rectangular enclosure comprised of modular fiberglass coated insulated panels 14 contains the storage 64, growth 66, and work 68 areas.

The entire unit, if assembled above ground, can be secured to the ground by bracket 72, tie down or rope 74, and anchors 76. When tied down, the lightweight unit can sustain high winds without damage. The growth area 66 is comprised of fiberglass structural shelf supports 46 attached to threaded bars 48. The threaded bars 48 extend from the floor to flat roof 60. The threaded bars 48 are attached to the floor and flat roof 60 by threaded collar 5 and flange 52. The flange 52 acts to distribute the load over a larger surface area of the panels 14. On each shelf or tray support 46 a shelf or tray 22 is placed. The threaded bars 48 permit secure placement as well as great flexibility in the positioning of the shelves or trays 22. The shelves or trays 22 can be positioned at any level on threaded bars 48.

FIG. 8 better illustrates the adjustable shelving. As can be seen in FIG. 8, the shelf or tray support 46 is placed through the threaded bar 48. The support 46 is then adjusted and held by adjustable shelf or tray nuts 54. The nut flange 70 is used to distribute the load. The nuts 54 can then be rotated to place the supports 46 and the shelves or trays 22 into any desired position. The nuts 54 can then be tightened to securely hold the support 46 in position. This results in a very rigid structure greatly increasing the structural strength of the unit as a whole once assembled.

The unit described above relating to FIGS. 6-8 can also incorporate the various electrical and mechanical systems described in any of the other embodiments also described in this disclosure.

The growth chambers described above have proven to provide organically pure and enhanced plant growth. The growth rate and nutrient content of the plants are greatly enhanced with the growth chambers. Additionally, scarce water and land is optimally utilized providing very efficient production. This greatly increased the yield with reduced cost over conventional growing methods. The growing chambers and systems described becomes increasingly important with the expanding concern over the origin and handling of the plants consumed by humans and animals.

While the invention has been described with respect to several embodiments, it will be understood and appreciated that variations and modifications may be made without departing from the scope and spirit of the invention.

What is claimed is:

1. A method of enhancing the growing of plant life comprising the steps of
   providing an enclosed chamber,
   maintaining the temperature within said chamber between 68 and 78 degrees Fahrenheit,
   coating the bottom of a seed tray with a nutrient gel,
   placing plant seeds to be grown in the nutrient gel,
   locating the seed tray with nutrient gel embedded with said seeds within the enclosed chamber,
   purifying a water supply by exposing said water supply to a broad spectrum light source,
   applying said purified water to said seeds at predetermined timed intervals,
   and illuminating said seeds with the broad spectrum light source for at least eight hours per day.

2. A method of enhancing the growth of plants comprising the steps of:
   providing an enclosed chamber;
   coating the bottom of seed trays with a nutrient gel;
   placing plant seeds in the nutrient gel within said trays;
   placing said trays containing said nutrient gel and seeds within said enclosed chamber;
   exposing water to a broad spectrum light source to effect purification of said water;
   watering said seeds with said purified water several times a day; and
   cycling said broad spectrum light source on and off at predetermined intervals.

3. The method as defined in claim 2 and including the step of cycling said broad spectrum light source during the watering of said seeds with said water to enhance the purification thereof.

4. The method as defined in claim 2 and including the step of rotating said trays within said enclosed chamber to provide a range of growth stages so that the plants do not mature at the same time.

5. The method as defined in claim 2 and including the step of watering said seeds with said purified water four to six times a day for approximately seven to fourteen minutes each time.

6. The method as defined in claim 2 whereby the watering of said seeds is effected by providing a fine mist of water over the trays.

7. The method as defined in claim 2 and including the step of filtering the water being misted as a fine spray.

8. The method as defined in claim 7 and including the step of aerating the water.

9. The method as defined in claim 2 and including the step of locating the broad spectrum light source on the wall of the chamber that allows the plant growth and root direction to follow the earth's magnetic field.

10. The method as defined in claim 2 and including the step of maintaining the chamber at a temperature ranging between 68 to 78 degrees Fahrenheit.

11. A method of enhancing the growth of plants comprising the steps of:
    providing an insulated enclosed chamber;
    disposing a plurality of seed trays within the enclosed chamber;
    coating the bottom of the trays with a nutrient gel;
    placing the plant seeds within the nutrient gel within said trays;
    exposing water for irrigating said plant seeds to a broad spectrum light source disposed within said chamber for effecting purification of said water;
    filtering said purified water;
    applying said filtered and purified water to said seeds by misting said filtered purified water over said seed trays;
    cycling said broad spectrum light source on during the misting of said seeds;
    effecting the watering of said seed with said filtered and purified water a predeterminate number of times a day for a predetermined period of time;
    maintaining the internal temperature of said enclosed chamber in the range of 68 to 78 degrees Fahrenheit;
    rotating said trays within said enclosed chamber to provide a range of growth stages so that the plants do not mature at the same time.

12. The method as defined in claim 11 and including the step of locating the broad spectrum light source adjacent the wall of the enclosed chamber to allow the plant growth and root direction to follow the earth's magnetic field.

* * * * *